(12) United States Patent
Dickel

(10) Patent No.: US 7,849,884 B2
(45) Date of Patent: Dec. 14, 2010

(54) PRESSURE HOSE FOR A WATER CARRYING SYSTEM

(75) Inventor: Heiko Dickel, Nachrodt-Wiblingwerde (DE)

(73) Assignee: Kottmann Gosla GmbH, Iserlohn (DE)

( * ) Notice: Subject to any disclaimer, the term of this patent is extended or adjusted under 35 U.S.C. 154(b) by 0 days.

(21) Appl. No.: 12/583,788

(22) Filed: Aug. 26, 2009

(65) Prior Publication Data

US 2010/0051131 A1    Mar. 4, 2010

(30) Foreign Application Priority Data

Aug. 27, 2008 (DE) .................. 10 2008 039 991

(51) Int. Cl.
*F16L 9/00* (2006.01)

(52) U.S. Cl. .................. 138/109; 138/122; 285/256; 285/242; 285/382

(58) Field of Classification Search ............... 138/109, 138/121, 122, 173, 125, 126, 110; 285/258, 285/256, 259, 508, 507, 222.2, 222.4
See application file for complete search history.

(56) References Cited

U.S. PATENT DOCUMENTS

| | | | |
|---|---|---|---|
| 3,605,817 A * | 9/1971 | Bauman et al. ............. | 138/121 |
| 4,330,142 A * | 5/1982 | Paini ........................... | 285/256 |
| 4,366,841 A * | 1/1983 | Currie et al. ................. | 138/109 |
| 4,369,992 A | 1/1983 | Fournier et al. ............. | 285/256 |
| 4,729,583 A * | 3/1988 | Lalikos et al. ............. | 285/222.1 |
| 5,129,686 A * | 7/1992 | Sanders et al. .............. | 285/258 |
| 5,209,267 A * | 5/1993 | Morin ......................... | 138/109 |
| 5,413,147 A * | 5/1995 | Moreiras et al. ............ | 138/109 |
| 5,597,985 A * | 1/1997 | Dear et al. ................... | 181/227 |
| 5,853,202 A * | 12/1998 | Li et al. ...................... | 285/256 |

FOREIGN PATENT DOCUMENTS

| | | |
|---|---|---|
| DE | 86 07 066 | 5/1986 |
| EP | 0 491 737 | 7/1992 |
| EP | 0 673 485 | 9/1995 |

* cited by examiner

*Primary Examiner*—Patrick F Brinson
(74) *Attorney, Agent, or Firm*—Collard & Roe, P.C.

(57) ABSTRACT

A functional pressure hose for a water-carrying system, particularly for connecting movable sanitary fittings or for connecting parts of the water-carrying system with one another, has an inner hose made of plastic and an outer jacket made of a braided material. At least one hose end is provided with a connector piece having a tubular connector, onto which the hose end is pressed. The inner hose is formed by a corrugated hose, and the tubular connector has circumferential ring beads that are adapted to the inner contour of the corrugated hose. At least some of the ring beads are provided with notches that run axially. The hose demonstrates great flexibility while maintaining the required pressure strength, but at the same time guarantees great bending protection.

7 Claims, 3 Drawing Sheets

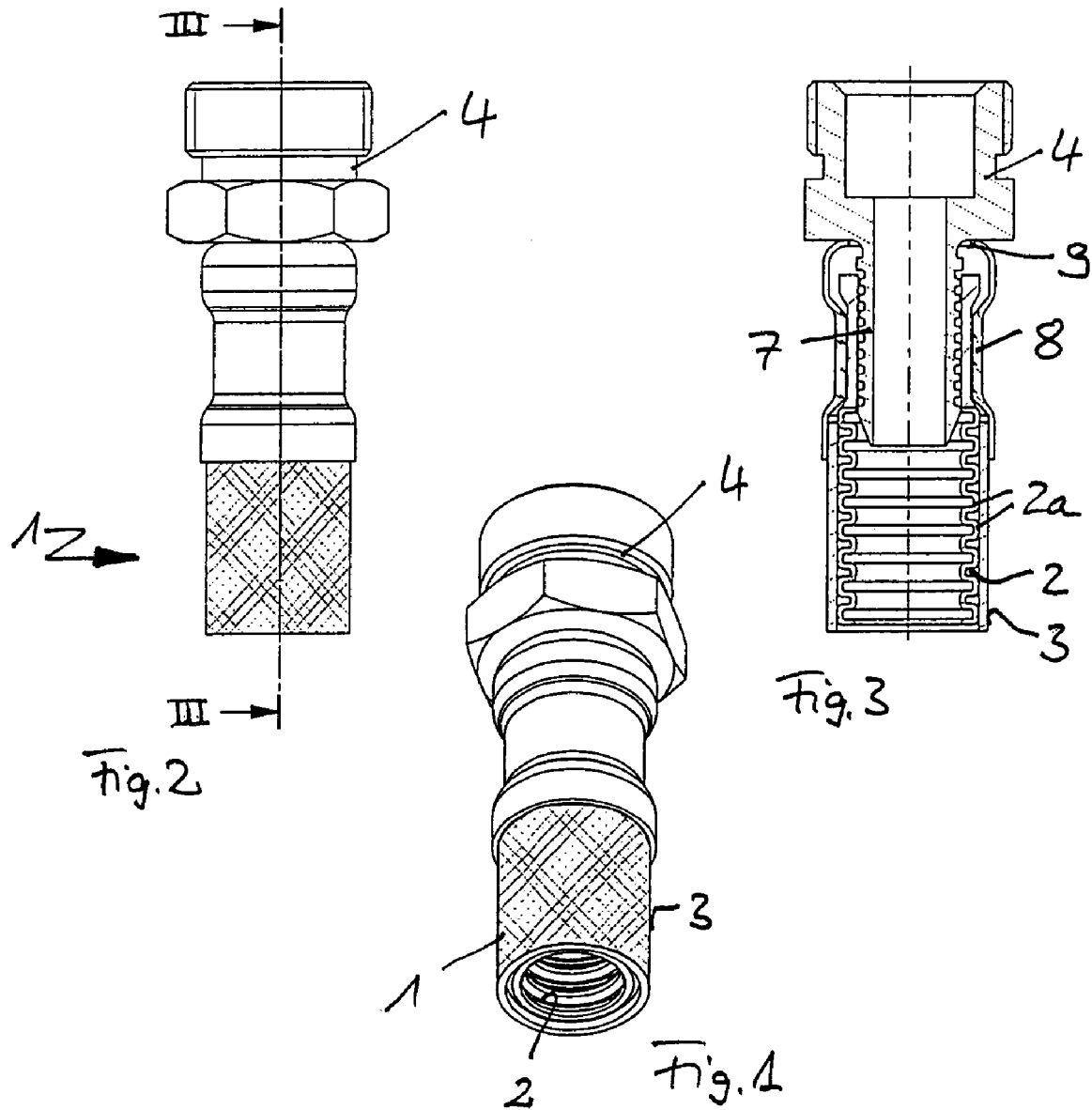

PRESSURE HOSE FOR A WATER CARRYING SYSTEM

CROSS REFERENCE TO RELATED APPLICATIONS

Applicants claim priority under 35 U.S.C. §119 of German Application No. 10 2008 039 991.4 filed on Aug. 27, 2008.

BACKGROUND OF THE INVENTION

1. Field of the Invention

The invention relates to a pressure hose for a water-carrying system, particularly for connecting movable sanitary fittings or for connecting parts of the water-carrying system with one another. The hose has an inner hose made of plastic and an outer jacket made of a braided material. At least one hose end is provided with a connector piece having a tubular connector, onto which the hose end is pressed.

2. The Prior Art

Pressure hoses of this type have been in use for a long time, in many different ways, particularly in the sanitary sector. In this connection, the smooth inner hose made of plastic serves as a water-carrying, fluid-tight medium, and the outer jacket made of a braided material serves for pressure stability. Such hoses have been limited in terms of their flexibility until now, since the inner hose is relatively rigid, at least if the wall thickness is correspondingly large to guarantee sufficient protection against bending.

For other areas of use, pressure hoses have already become known, as well, in which the inner hose does not consist of a smooth hose, but rather of a corrugated hose. For example, a pressure hose for the greatest demands is described in German Patent Application No. DE 86 07 066 U1, which has an inner hose made of a corrugated tubular film of polytetrafluoroethylene and an outer wall reinforcement that can consist of a tight-mesh stainless steel braiding. Such a hose is particularly intended for industrial applications, for example in oil drilling or in the manufacturing industry, and has increased flexibility and a reduced bending radius because of the inner hose that is selected. Such a hose is supposed to be able to be used with conventional connection systems. However, such connection systems are not suitable for a hose in the sanitary sector, in which the hose end is generally pressed onto a tubular connector, using a pressure sleeve that lies on the outside.

SUMMARY OF THE INVENTION

It is therefore an object of the invention to create a functional pressure hose for a water-carrying system that demonstrates great flexibility while maintaining the required pressure resistance, but at the same time guarantees great protection against bending.

This task is accomplished according to the invention, in that the inner hose is formed by a corrugated hose, and the tubular connector has circumferential ring beads that are adapted to the inner contour of the corrugated hose. At least some of the ring beads are provided with notches that run axially.

Thus, a pressure hose is made available that makes use of the known advantages of an inner hose formed by a corrugated hose, but is adapted to the special conditions in the sanitary sector, with regard to pressure resistance and bending protection. Because of the special configuration of the connector, with circumferential ring beads and grooves and notches that run axially, at least in part of the ring beads, it is guaranteed that the inner hose end is pressed together with the connector, in a pressure-tight manner. Twisting protection of the hose relative to the connector is also reliably guaranteed, since the inner hose is pressed into the notches when the inner hose is pressed on. The inner corrugated hose then makes contact in a tight and torque-proof manner, because of the adaptation of the ring bead contour and groove contour of the tubular connector to the contour of the corrugated hose.

In one embodiment, the corrugated hose has parallel corrugations. A parallel corrugation is understood to mean that the corrugations are configured parallel to one another, and run on a circular circumference, symmetrical to the longitudinal axis of the hose. In other words, the corrugations are not configured in a screw shape or spiral shape. Such a hose has great flexibility at small bending radii, without the undesirable effect of spiral-shaped or screw-shaped torsion or twisting.

In another embodiment, the corrugated hose can be configured differently over its length, in order to influence the flexibility in certain regions of the hose, for example the end regions, in targeted manner, and to contribute to reducing the noise development that results from the flow behavior within the hose.

For this purpose, the distance between adjacent corrugations of the corrugated hose can deviate from the axial width of the corrugations. Thus, the flow dead spaces that occur in the hose interior below the corrugations can be influenced in targeted manner, in order to reduce noise development and to achieve the most laminar flow in the hose that is possible.

Furthermore, the distance between adjacent corrugations of the corrugated hose can be configured differently along the hose length, in order to be able to vary the flexibility along the hose length.

Furthermore, the axial width of the corrugations of the corrugated hose can be made different along the hose length.

Preferably, polyethylene, polypropylene, or any other suitable material approved for drinking water is provided as the material for the corrugated hose. The outer hose preferably consists of a braiding made of plastic and/or metal, particularly stainless steel or aluminum.

The pressure hose according to the invention is preferably configured as a pressure-resistant connecting hose, as a kitchen spray hose, or as a retractable hose for shower hoses.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a perspective representation of a pressure hose according to the invention, shown in sections, having a connector piece on the end side;

FIG. 2 shows a side view of the pressure hose according to FIG. 1;

FIG. 3 shows a section along the line III-III in FIG. 2;

DETAILED DESCRIPTION OF THE PREFERRED EMBODIMENT

Referring now in detail to the drawings, a pressure hose according to the invention is shown in FIGS. 1 to 3, only in certain sections, with a hose end, and referred to in general as 1. This pressure hose 1 for a water-carrying system, particularly for connecting movable sanitary fittings, such as a kitchen spray or also a shower or shower fitting, or for connecting parts of the water-carrying system with one another, as a connecting hose, has an inner hose and an outer jacket.

The inner hose is formed by a corrugated hose 2 made of plastic, which is preferably configured with parallel corrugations. This inner corrugated hose 2 is surrounded by an outer jacket 3 made of a braided material, which rests directly against inner corrugated hose 2.

Inner corrugated hose 2 made of plastic can consist of polyethylene, for example. Outer jacket 3 consists of a braided material made of plastic or metal, or of a combination of these materials. Possible metals are particularly stainless steel or aluminum.

Figures 4, 5:
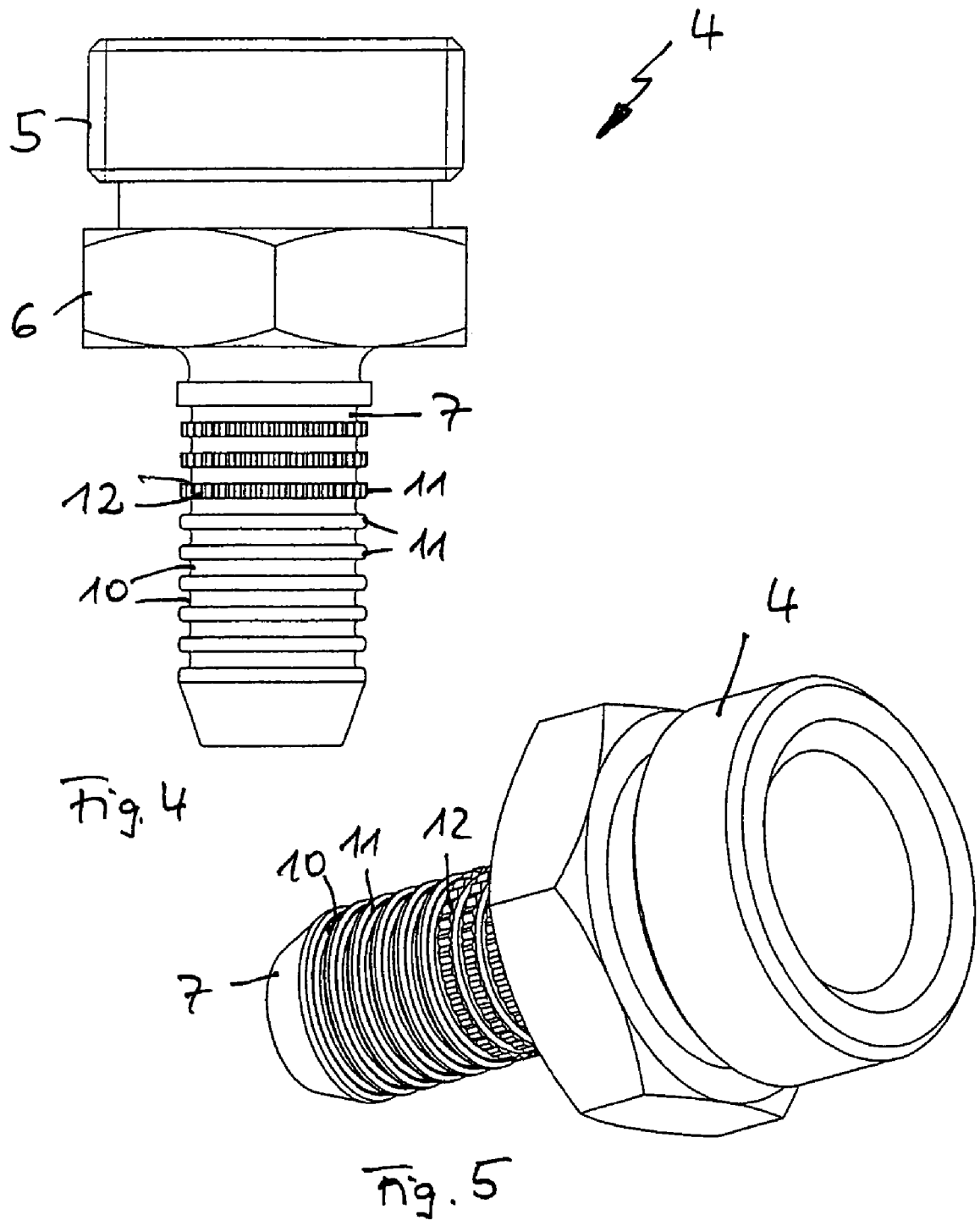
FIG. 4 shows the connector piece of the pressure hose in a side view.
FIG. 5 shows a perspective representation of the connector piece according to FIG. 4.
Figure 6:
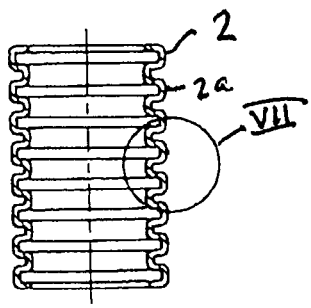
FIG. 6 shows an enlarged view of the hose of FIG. 1.

At least one end of pressure hose 1 is provided with a connector piece designated as 4 (see, in particular, FIGS. 4 and 5). Connector piece 4, which can be provided with an outside thread 5 and, adjacent to that, with a hexagonal edge 6, at its free end, has a tubular connector 7 onto which the end of pressure hose 1 is pressed, for which purpose a pressure sleeve 8 is used, which is disposed on the outside on outer jacket 3, and forms a counter-bearing for connector 7 that is pressed in. In this connection, the pressing process is preferably carried out, at the end of pressure sleeve 8, in a region 9, so that direct metal contact between region 9 of pressure sleeve 8 and connector 7 is produced.

Tubular connector 7 is provided with circumferential grooves 10, in adaptation to the inner contour of inner corrugated hose 2, which grooves are formed by adjacent circumferential ring beads 11. Before being pressed, pressure hose 1 is placed onto the connector of connector piece 4 in such a manner that inner corrugated hose 2 lies against ring beads 11 of connector 7 with its corrugations 2a that are directed radially outward, and engages into grooves 10 with its regions that lie in between.

Aside from this adaptation of connector 7 to the inner contour of pressure hose 1, at least some of ring beads 11 of connector 7 have notches 12 that run axially. These notches serve as protection against twisting between pressure hose 1 and connector piece 4. When the hose end is pressed together with connector piece 4, the corresponding hose regions are pressed into notches 12, so that twisting of pressure hose 1 relative to connector piece 4 is reliably avoided.

Figure 7:
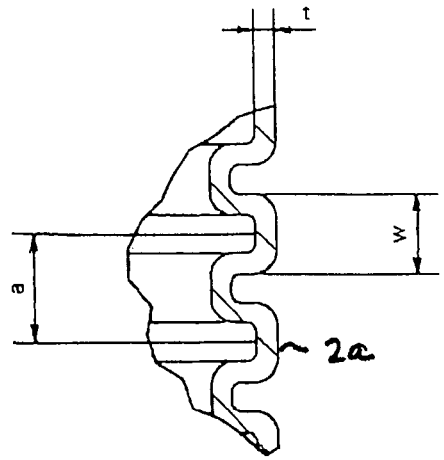
FIG. 7 shows a detail VII from the hose of FIG. 6.
Figure 8:
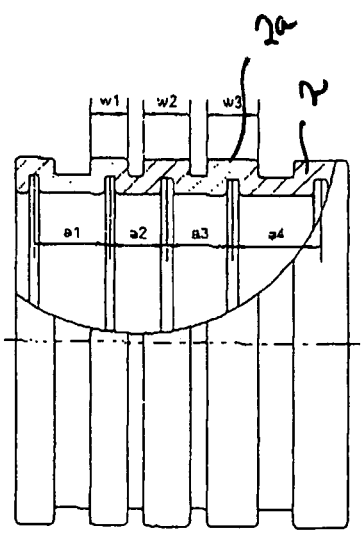
FIG. 8 shows a hose in partial cross section having corrugations separated by different distances.
Figure 9:
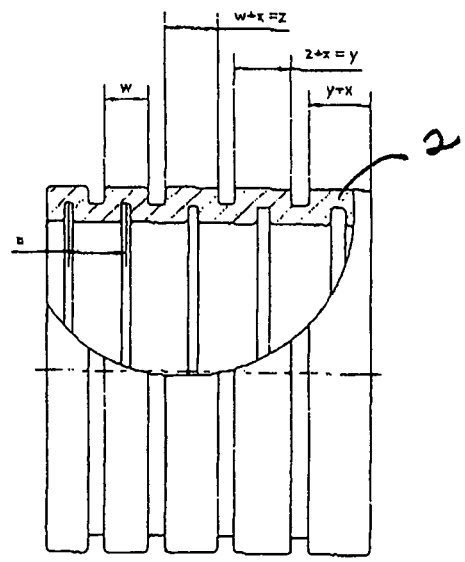
FIG. 9 shows a hose in partial cross section having corrugations different widths.

Inner hose 2 can have a special geometric configuration, in adaptation to different conditions of. For example, the distance between adjacent corrugations 2a of corrugated hose 2 can deviate from the axial width of corrugations 2a, as shown in FIG. 7. Furthermore, the distance between adjacent corrugations 2a can be configured differently along the hose length, as shown in FIG. 8. Furthermore, it is possible that the axial width of corrugations 2a of corrugated hose 2 is different along the hose length, as shown in FIG. 9. By means of this variation of the geometric configuration of inner corrugated hose 2, it is possible to influence the flexibility over the hose length. Furthermore, the axial expanse of the flow dead spaces formed in the interior of inner corrugated hose 2 by the corrugations 2a can be influenced in a targeted manner, in order to achieve as laminar a flow in pressure hose 1 as possible, so that as little flow noise as possible is produced.

Of course, the invention is not restricted to the embodiments shown. Other embodiments are possible without leaving the basic idea of the invention. For example, the notches 12 can also have a different configuration and be disposed differently, and more of the like.

What is claimed is:

1. A pressure hose for a water-carrying system, comprising:
    an inner hose made of plastic and being formed as a corrugated hose with parallel corrugations;
    an outer jacket made of a braided material and directly surrounding the inner hose;
    at least one connector piece having a tubular connector, onto which a hose end is pressed by means of a pressure sleeve, said tubular connector having circumferential ring beads that are adapted to an inner contour of the corrugated hose,
    wherein at least some of the ring beads are provided with notches that run axially.

2. The pressure hose according to claim 1, wherein a distance between adjacent corrugations of the corrugated hose deviates from an axial width of the corrugations.

3. The pressure hose according to claim 2, wherein the distance between adjacent corrugations of the corrugated hose differs along a length of the hose.

4. The pressure hose according to claim 1, wherein an axial width of the corrugations of the corrugated hose differs along a length of the hose.

5. The pressure hose according to claim 1, wherein the inner hose consists of polyethylene or polypropylene.

6. The pressure hose according to claim 1, wherein the outer jacket consists of plastic or metal.

7. The pressure hose according to claim 1, wherein the hose is configured as a pressure-resistant connecting hose, as a kitchen spray hose, or as a retractable hose for shower hoses.

* * * * *

(12) EX PARTE REEXAMINATION CERTIFICATE (10086th)

United States Patent
Dickel

(10) Number: US 7,849,884 C1
(45) Certificate Issued: Mar. 25, 2014

(54) PRESSURE HOSE FOR A WATER CARRYING SYSTEM

(75) Inventor: Heiko Dickel, Nachrodt-Wiblingwerde (DE)

(73) Assignee: Kottmann Gosla GmbH, Iserlohn (DE)

Reexamination Request:
No. 90/009,986, Feb. 14, 2012

Reexamination Certificate for:
Patent No.: 7,849,884
Issued: Dec. 14, 2010
Appl. No.: 12/583,788
Filed: Aug. 26, 2009

(30) Foreign Application Priority Data

Aug. 27, 2008 (DE) .......... 10 2008 039 991

(51) Int. Cl.
*F16L 9/00* (2006.01)
(52) U.S. Cl.
USPC ........... 138/109; 138/122; 285/256; 285/242; 285/382

(58) Field of Classification Search
None
See application file for complete search history.

(56) References Cited

To view the complete listing of prior art documents cited during the proceeding for Reexamination Control Number 90/009,986, please refer to the USPTO's public Patent Application Information Retrieval (PAIR) system under the Display References tab.

*Primary Examiner* — Joseph A. Kaufman

(57) ABSTRACT

A functional pressure hose for a water-carrying system, particularly for connecting movable sanitary fittings or for connecting parts of the water-carrying system with one another, has an inner hose made of plastic and an outer jacket made of a braided material. At least one hose end is provided with a connector piece having a tubular connector, onto which the hose end is pressed. The inner hose is formed by a corrugated hose, and the tubular connector has circumferential ring beads that are adapted to the inner contour of the corrugated hose. At least some of the ring beads are provided with notches that run axially. The hose demonstrates great flexibility while maintaining the required pressure strength, but at the same time guarantees great bending protection.

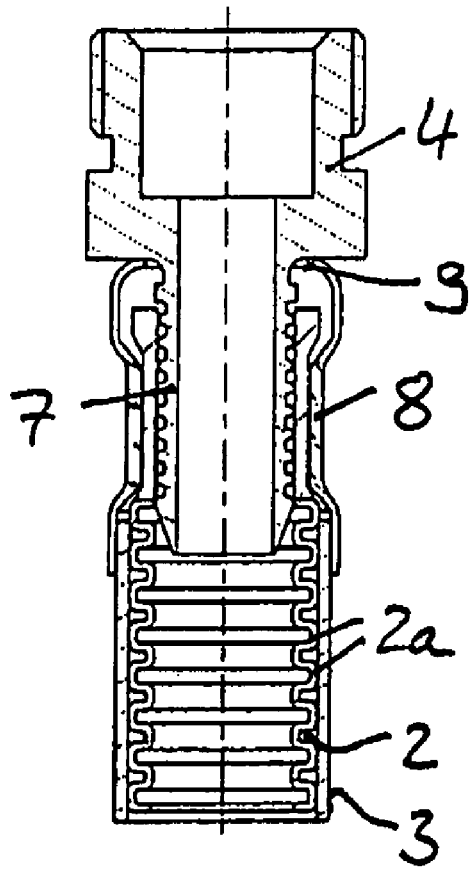

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7, dependent on an amended claim, are determined to be patentable.

1. A pressure hose for a water-carrying system, comprising:
    an inner hose made of plastic and being formed as a corrugated hose with parallel corrugations, *said inner hose extending the entire length of the pressure hose*;
    an outer jacket made of a braided material and directly surrounding the inner hose;
    at least one connector piece having a tubular connector, onto which a hose end is pressed by means of a pressure sleeve, said tubular connector having circumferential ring beads that are adapted to an inner contour of the corrugated hose,
    wherein at least some of the ring beads are provided with notches that run axially, *and*
    *wherein the inner hose is pressed into grooves of the connector formed between the ring beads, by means of the pressure sleeve.*

* * * * *